Figure 1:
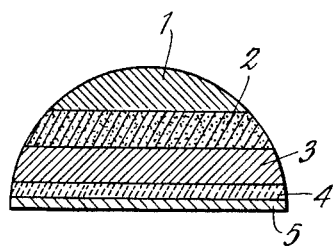

Jan. 25, 1966   A. R. WATSON ET AL   3,231,368
TREATMENT OF MOLTEN IRON
Filed May 22, 1963

INVENTORS
ALBERT RALPH WATSON
GEORGE WESLEY AUSTIN by: Wolfe, Hubbard, Voit & Osann
ATTYS.

United States Patent Office 3,231,368
Patented Jan. 25, 1966

3,231,368
TREATMENT OF MOLTEN IRON
Albert Ralph Watson and George Wesley Austin, Birmingham, England, assignors to Foseco International Limited, Birmingham, England, a British company
Filed May 22, 1963, Ser. No. 282,268
Claims priority, application Great Britain, May 29, 1962, 20,695/62
11 Claims. (Cl. 75—58)

This invention relates to the treatment of molten iron and more particularly to the production of so-called nodular irons.

Nodular irons are produced by treating the molten iron with reactive metals, e.g. magnesium metal. Due to the volatility and high reactivity of magnesium metal the method as currently practiced is wasteful of material and of low efficiency.

There is, in the first place, a considerable loss of magnesium as vapour or as magnesium oxide (by combination with atmospheric oxygen). At the temperature of molten iron magnesium boils off as vapour at such temperatures the burning of the magnesium to form magnesium oxide is very rapid. For these reasons, a degree of efficiency, i.e. measured in terms of the proportion of added magnesium which is actually effective in modifying the properties of the molten iron, of the order of 10%, is considered good, and frequently an efficiency of the order of 5% may be all that is achieved.

Secondly, if there is sulphur present in the iron, this tends to react preferentially with the magnesium so that it is necessary to add a quantity of magnesium sufficiently large to compensate also for the loss due to reaction with the sulphur. Having regard to the low efficiency levels which are obtained, as referred to above, this means a considerable increase in the actual consumption of magnesium.

In an effort to improve the efficiency, two main methods have been employed. In the first place, various systems have been devised for holding the magnesium below the surface of the molten metal. By such means the efficiency can be raised to the order of 20% but the equipment necessary to hold the magnesium below the surface of the molten metal is frequently cumbersome and the whole technique involves a substantial increase in operating costs. Furthermore, it has been proposed to reduce the sulphur content of the iron, by addition of cheaper desulphurising agents, before adding the magnesium. This however, while effective, complicates the process by necessitating two separate treatments and the time involved in the overall treatment is considerably increased.

It is an object of the present invention to provide a new method for the treatment of molten iron whereby it is desulphurised and/or modified to yield nodular iron and to provide new products for use in the said method.

According to a first feature of the present invention there is provided a multilayer product which comprises, in order, a layer containing elemental magnesium, magnesium silicide, a composition which liberates magnesium on heating, or any other desulphurising or nodularising agent for molten iron, a layer of heat-insulating refractory material and a layer of a composition which contains ingredients which will react together exothermically to generate, when fired, a high melting point fluid slag. In a particular form of such a multilayer product the desulphurising and/or nodularising layer, when it is a magnesium-containing layer, may carry as outer layers, one or more layers containing desulphurising agents other than magnesium.

Such a multilayer product may be placed in the bottom of a vessel and the exothermic layer fired. A high melting point fluid slag is formed and, on cooling, cements the remainder of the product to the surface to which it has been applied. The presence of the refractory layer serves to prevent the heat of the exothermic reaction from deleteriously affecting the remaining layers of the product.

According to a further feature of the invention there is provided a method for the treatment of molten iron, to effect desulphurisation of the iron and/or form nodular iron, which comprises pouring molten iron into a vessel to a part of which, below the surface of the molten metal, is cemented, as indicated above, a said multilayer product.

In one modification of the multilayer product of the invention there are two adjacent layers each containing a desulphurising agent and the two layers are superimposed on the magnesium-containing layer.

The desulphurising layer or layers may contain, for example, finely divided carbon and an alkali metal carbonate, calcium carbide or calcium silicide. Other desulphurising agents (other than magnesium metal) may be advantageously employed.

The magnesium-containing layer may contain the magnesium in powder form and advantageously contain a small amonut of a rare earth metal, such as cerium. The magnesium and cerium may be present as a powdered alloy of these elements. Alternatively, this layer may consist of a suitable porous refractory material impregnated with magnesium, e.g. bauxite, a high-alumina aluminosilicate fire-brick, furnace aggregate or a porous metal, silicon carbide or carbon compact, impregnated with magnesium. As indicated above this layer may contain, material of or in addition to, magnesium itself, magnesium silicide or a composition which on heating generates magnesium. A composition of this latter type may consist essentially of a magnesium salt, preferably a halide and a reducing agent. Thus a useful composition consists of:

|  | Percent |
|---|---|
| Magnesium fluoride | 27.5 |
| Cryolite | 1.0 |
| Ceric oxide | 1.0 |
| Calcium silicide | 70.5 |
|  | 100.0 |

The refractory layer is very conveniently based essentially on grog but other refractory materials known in the foundry art may be employed, e.g. dolomite, sand, zircon sand, chamotte or the like.

The exothermic composition may be of the type known under the registered trademark "Thermit" being a composition consisting essentially of iron oxide and aluminum. More generally, it may contain any readily oxidisable metal, such as aluminum, silicon or magnesium, together with any oxidising agent, any of those conventionally used in exothermic compositions in foundry practice, e.g. iron oxide, manganese dioxide, or alkali metal or alkaline earth metal, nitrates or chlorates, or mixtures of any of these. It should preferably contain a siliceous material as this provides a ready means whereby a fluid slag is produced, e.g. calcium silicide, ferrosilicon or silican (e.g. as sand).

It may contain a small amount, e.g. 0.1 to 15% of a fluoride, which serves to steady the exothermic reaction, examples being the alkali metal and alkaline earth metal fluorides and complex fluorides, e.g. sodium or potassium fluorides, sodium or potassium cryolites, aluminum fluoride, titanofluorides, silico-fluorides and borofluorides.

The actual formulation of the exothermic composition will conveniently be varied to suit the proposed conditions of use. Thus, it should be formulated so that the temperature generated is sufficient to form a liquid slag which is solid at the temperature of the vessel with which the tablet is to be used and remains solid or only slowly becomes pasty at the temperature of the molten metal which is poured.

The constituents of the various layers may be bonded together with any convenient binder, of which alkali metal silicates have been found to be an especially advantageous class. The multiplayer product is preferably oven-dried to remove any free moisture before it is put to use.

In carrying out the method of the invention it is first necessary to cement the multilayer product, by way of the slag produced from the exothermic layer as described above, to the treatment vessel. It must be affixed at some point which will be below the level of the molten iron when that has been poured into the vessel and, in general, will be affixed to the base of the vessel.

When the molten iron is poured into the treatment vessel it does not disturb the multilayer product, which remains affixed in position. When a desulphurising layer is present covering a magnesium-containing layer, it prevents immediate contact of the molten iron with the magnesium. In such a case the materials of such outer desulphurising layers are usually wholly consumed in carrying out the desulphurising action and this action is wholly, or substantially wholly, effected before the molten iron makes full contact with the magnesium-containing layer. The reaction of the magnesium when it does occur, occurs much less violently, and it performs any final desulphurisation and the modification of the molten metal necessary to produce nodular iron.

Figure 2:
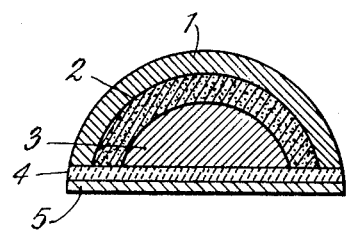

The multilayer product may be in various forms, of which two are illustrated in FIGURES 1 and 2 of the accompanying drawings. In these figures the layers shown consist of a layer 1 of desulphurising agent, a second layer 2 of desulphurising agent, a layer 3 containing elemental magnesium, a refractory layer 4 and a layer 5 of exothermic composition as described above.

The following example will serve to illustrate the invention.

*Example*

Five hundredweight of molten grey iron of sulphur content 0.05% were tapped into a ladle to the base of which had been cemented a tablet of the form shown in FIGURES 1 of the accompanying drawings and wherein the composition of the layers was as follows (numeral references correspond to FIGURE 1 of the accompanying drawings).

Layer 1—57 gms. sodium carbonate, 57 gms. powdered carbon, 28 gms. liquid sodium silicate.
Layer 2—57 gms. calcium silicide, 57 gms. powdered carbon, 28 gms. liquid sodium silicate.
Layer 3—132 gms. of 97% magnesium, 3% cerium alloy, 120 gms. powdered carbon, 64 gms. liquid sodium silicate.
Layer 4—A ⅜" thickness of granulated grog bonded with 20% of its weight of liquid sodium silicate.
Layer 5—A ¼" to ⅜" thickness of exothermic composition with the following proportions of ingredients:

| | Percent |
|---|---|
| Calcium silicide | 35 |
| Millscale | 20 |
| Manganese dioxide | 20 |
| Potassium chlorate | 8 |
| Aluminium | 8 |
| Alumina | 5 |
| Gum arabic | 4 |

The layers were laid down successively in a mould and the compacted shape was oven-dried before use.

The compacted shape was cemented to the bottom of the ladle by firing the layer 5 and allowing the liquid slag formed to cool in situ.

After the molten iron has been tapped into the ladle and the reaction of the tablet had ceased, a portion of it was cast. The cast specimen was found to have negligible sulphur content and to be of good nodular structure.

By means of the process of this invention, e.g. as carried out in the foregoing example, it has been found possible to achieve a 50% efficiency in the utilization of the magnesium metal and sometimes even better efficiencies.

It is to be understood that the layers of desulphurising agent other than magnesium are not necessarily present, very satisfactory results being obtained without such layers, especially when the magnesium is impregnated in a porous refractory as referred to above.

In a modification of the process of the invention there may be employed, instead of a multilayer product as described above which contains a layer of exothermic composition as specified, a similar multilayer product without the layer of exothermic composition, the exothermic composition then being applied separately to the vessel, fired and, before it is cooled, the multilayer product caused to adhere to it by means of the fluid slag produced by such firing.

We claim as our invention:

1. A process for placing a vessel in condition for the treatment of molten iron poured into it which comprises firing the exothermic layer of a multilayer product which comprises, in order, a layer containing a desulphurising agent for molten iron, a layer of heat-insulator, and a layer of an exothermic composition which contains an oxidisable metal, an oxidising agent therefor and a siliceous material, thereby producing from said layer a high melting point fluid slag, contacting the said slag with the inner surface of the vessel and allowing the slag to cool, whereby the product is cemented by said slag to said surface.

2. A multilayer product which comprises, in order a layer containing a desulphurising agent for molten iron, a layer of heat-insulator and a layer of an exothermic composition which contains an oxidisable metal, an oxidising agent therefor and a siliceous material.

3. A multilayer product which comprises, in order, a layer containing elemental magnesium, a layer of heat-insulator and a layer of exothermic composition which contains an oxidisable metal, an oxidising agent therefor and a siliceous material.

4. A multilayer product which comprises, in order, a layer containing magnesium silicide, a layer of heat-insulator and a layer of an exothermic composition which contains an oxidisable metal, an oxidising agent therefor and a siliceous material.

5. A multilayer product which comprises, in order, a layer containing magnesium and cerium, a layer of heat-insulator material and a layer of an exothermic composition which contains an oxidisable metal, an oxidising agent therefor and a siliceous material.

6. A multilayer product which comprises, in order, a layer containing a porous refractory containing magnesium, a layer of heat-insulator, and a layer of an exothermic composition which contains an oxidisable metal, an oxidising agent therefor and a siliceous material.

7. A multilayer product which comprises, in order, a layer containing a desulphurising agent for molten iron, a layer of heat-insulator, and a layer of an aluminothermic composition containing a siliceous ingredient.

8. A multilayer product which comprising, in order, a layer containing magnesium, a layer of heat-insulator and a layer of an aluminothermic composition which contains a siliceous ingredient.

9. A multilayer product which comprises, in order, a layer containing finely divided carbon and a compound selected from the class consisting of alkali metal carbonates, calcium carbide and calcium silicide, a layer containing magnesium and cerium, a layer of heat-insulator and a layer of an aluminothermic composition which contains a siliceous ingredient.

10. A multilayer product which comprises, in order, a layer containing finely divided carbon and a desulphurising agent for molten iron selected from the class consisting of alkali metal carbonates, calcium carbide and calcium silicide, a second layer containing magnesium, a third layer of heat insulator and a fourth layer of an exothermic composition which contains an oxidisable metal, an oxidising agent therefor and a siliceous material.

11. A multilayer product which comprises, in order, a layer containing finely divided carbon and a desulphurising agent for molten iron selected from the class consisting of alkali metal carbonates, calcium carbide and calcium silicide, a second layer containing magnesium, a third layer of heat insulator and a fourth layer of an aluminothermic composition which contains a siliceous ingredient.

References Cited by the Examiner
UNITED STATES PATENTS

| | | | |
|---|---|---|---|
| 1,275,449 | 8/1918 | Lemon | 75—93 |
| 1,869,925 | 8/1932 | Turnbull | 75—93 |
| 2,888,342 | 5/1959 | Fraser | 75—93 |
| 2,915,386 | 12/1959 | Strauss | 75—93 |
| 3,017,267 | 1/1962 | Bartson | 75—130 |

DAVID L. RECK, *Primary Examiner.*

WINSTON A. DOUGLAS, *Examiner.*